United States Patent
Lim et al.

(10) Patent No.: US 7,857,529 B2
(45) Date of Patent: Dec. 28, 2010

(54) SHUTTER DEVICE

(75) Inventors: Soo Cheol Lim, Incheon-si (KR); Young Ho Cho, Daejeon-si (KR); Dae Geon Seo, Daegu-si (KR); Jae Ho Moon, Gyeonggi-do (KR); Young Bok Yoon, Gyeonggi-do (KR); Chuel Jin Park, Gyeonggi-do (KR); Ji Hwan Shin, Gyeonggi-do (KR); Yong Soo Oh, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 286 days.

(21) Appl. No.: 12/207,806

(22) Filed: Sep. 10, 2008

(65) Prior Publication Data

US 2009/0263119 A1   Oct. 22, 2009

(30) Foreign Application Priority Data

Apr. 22, 2008   (KR) ...................... 10-2008-0037345

(51) Int. Cl.
*G03B 9/08* (2006.01)
(52) U.S. Cl. ...................... 396/464; 396/452
(58) Field of Classification Search ................ 396/449, 396/450, 452, 457, 463, 464, 505, 506, 508
See application file for complete search history.

(56) References Cited

U.S. PATENT DOCUMENTS 4,514,064 A * 4/1985 Kurosu et al. ............... 396/464

FOREIGN PATENT DOCUMENTS

KR   10-2007-0054772   5/2007

* cited by examiner

*Primary Examiner*—W. B. Perkey
*Assistant Examiner*—Minh Q Phan
(74) *Attorney, Agent, or Firm*—McDermott Will & Emery LLP

(57) ABSTRACT

Provided is a shutter device including a coil layer that includes one or more substrates having a through-hole formed in the center thereof and a coil installed thereon, the coil generating a magnetic field when a current is applied; and a shutter layer that is installed on one surface of the coil layer and includes a shutter case having a shape corresponding to the substrate and a pair of shutter blades which are connected to flexible suspensions formed in the shutter case, respectively. The shutter blades open and close the through-hole of the substrate, while being moved in the reverse direction to each other by an electromagnetic force caused by an interaction with the magnetic field generated by the coil and returning to the original position due to the recovery force of the flexible suspensions when the electromagnetic force is canceled.

43 Claims, 8 Drawing Sheets

[FIG. 1]
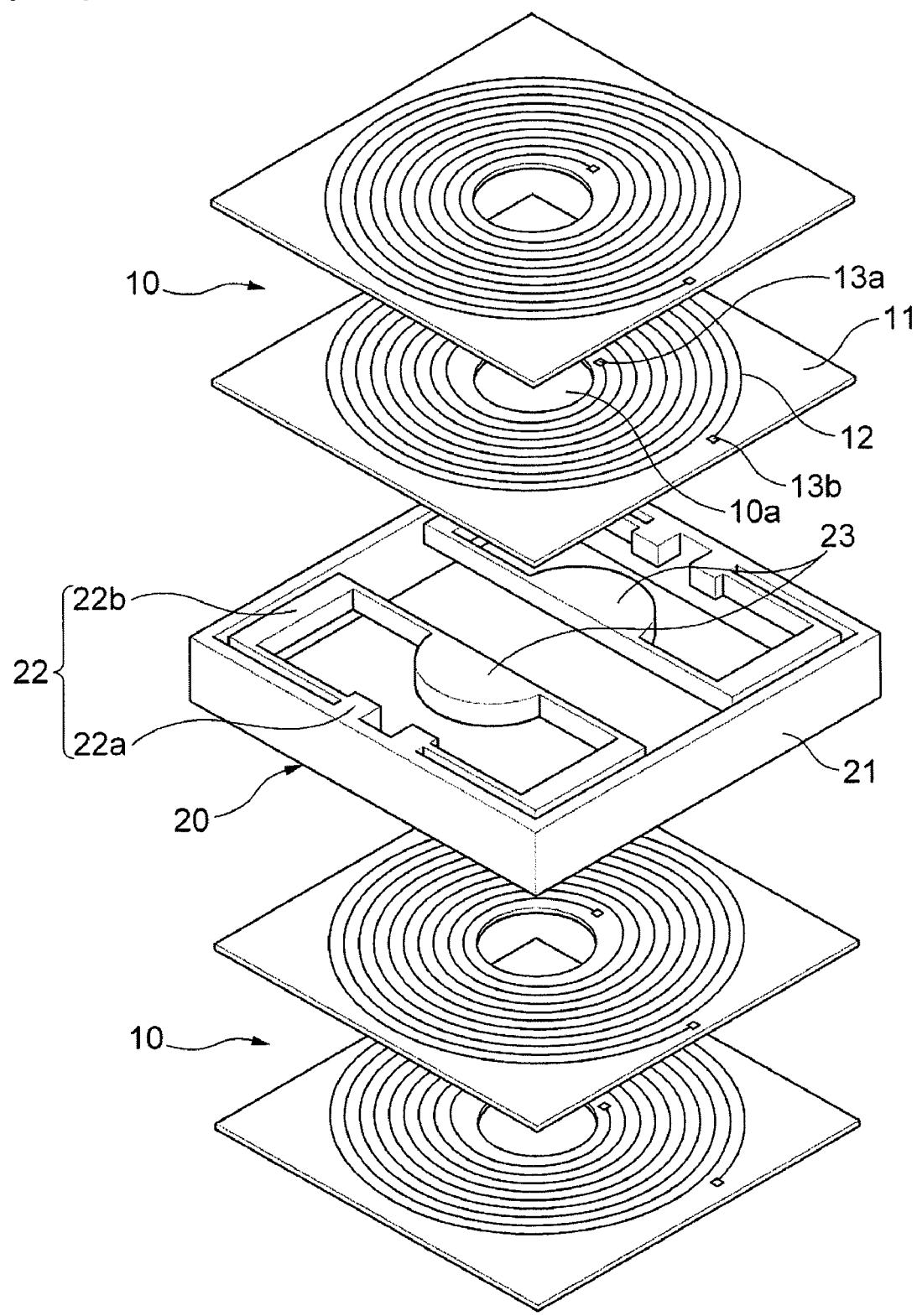

[FIG. 2]
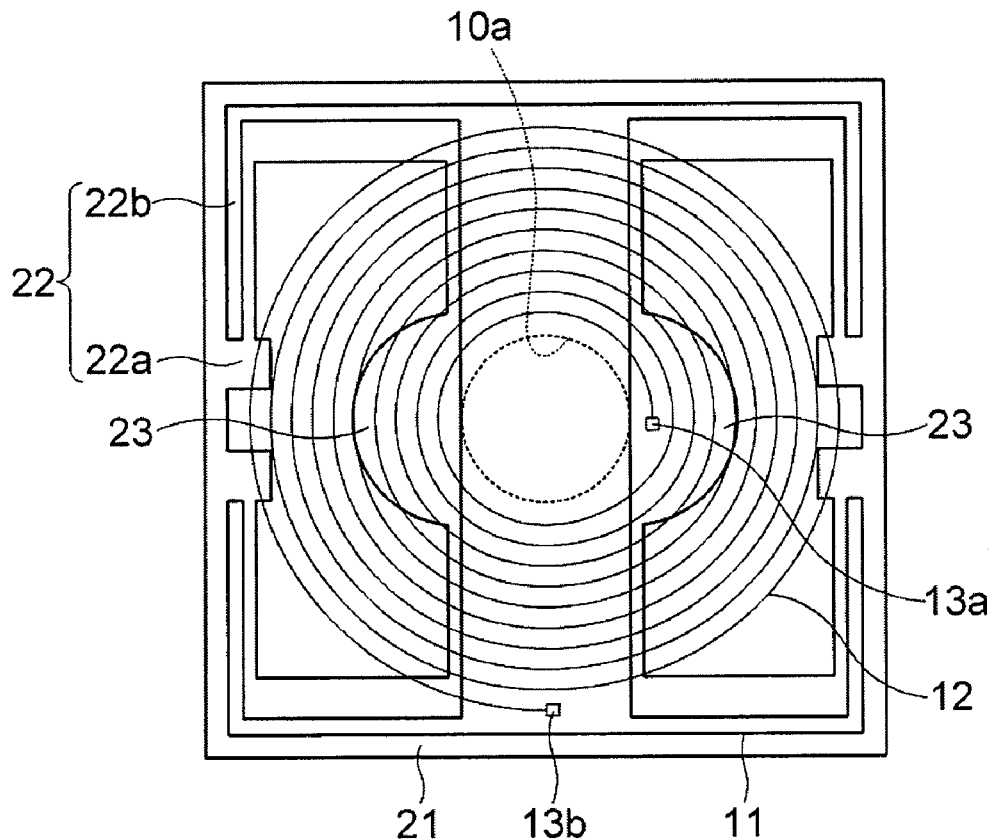
[FIG. 3]
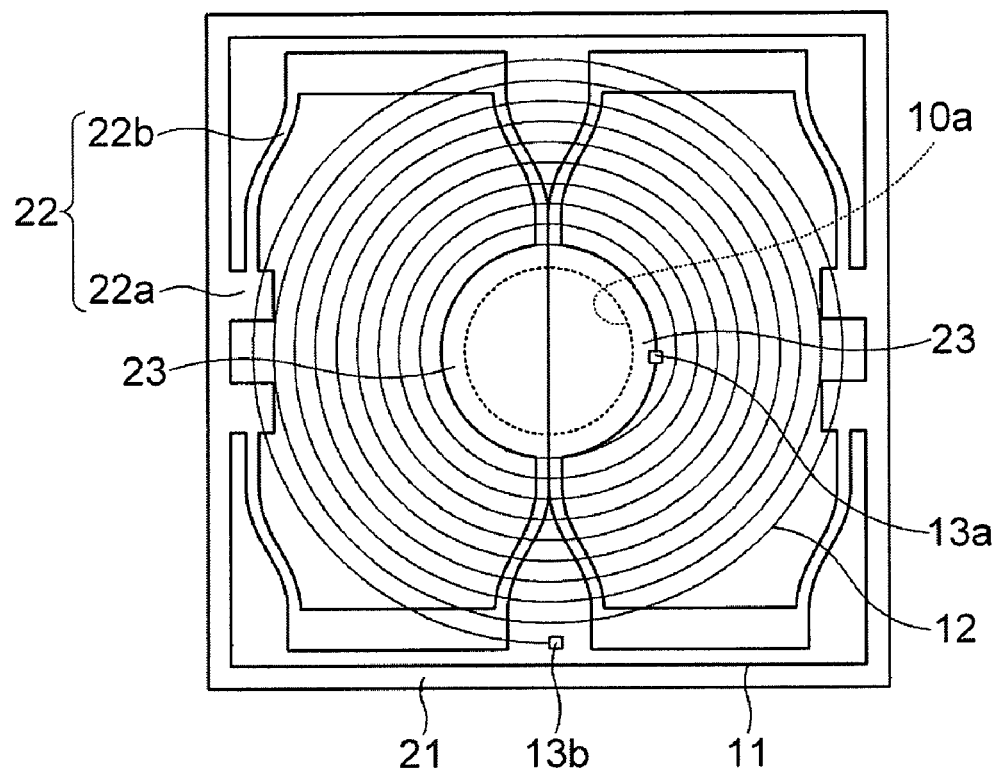

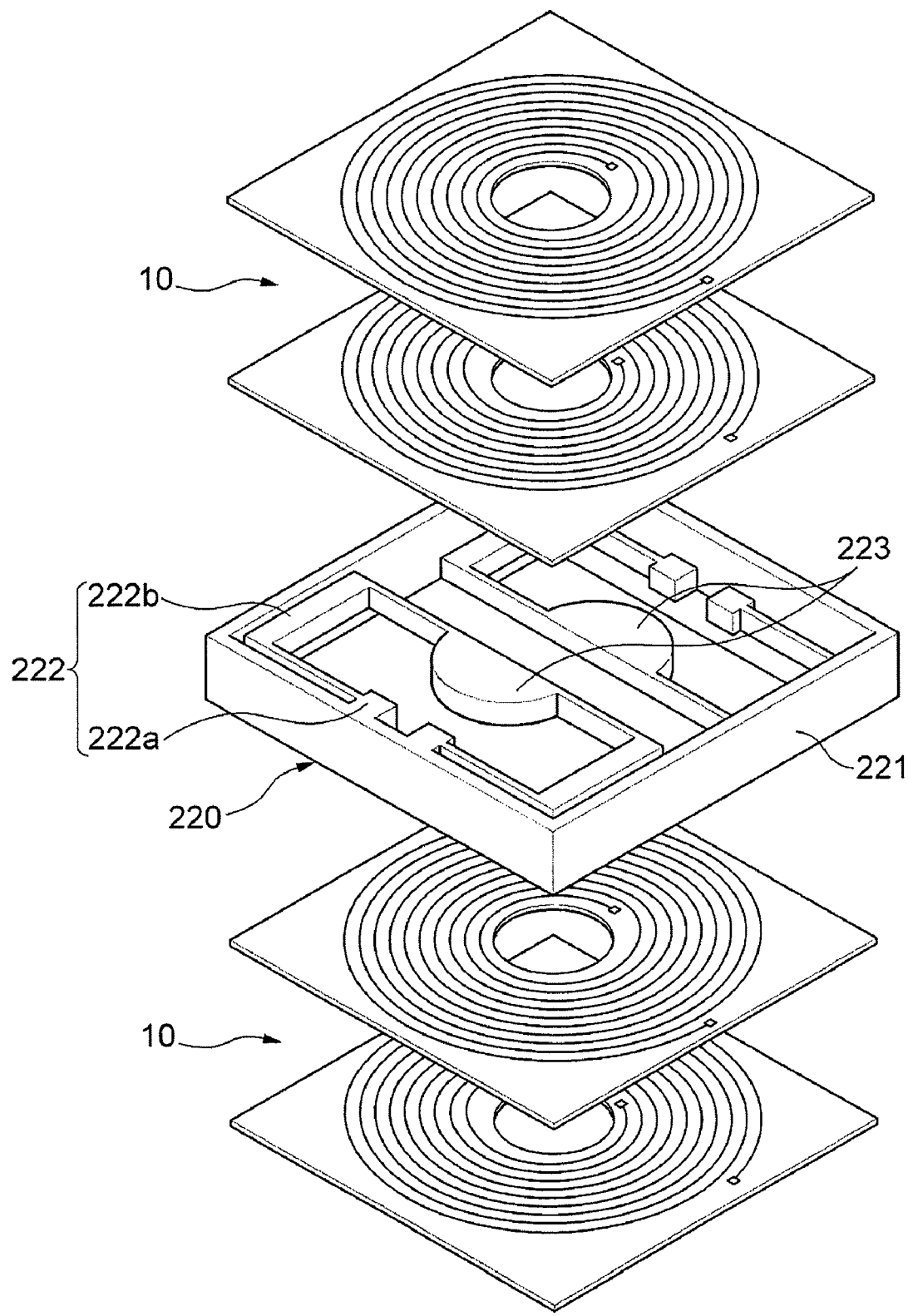
[FIG. 4]

[FIG. 5]
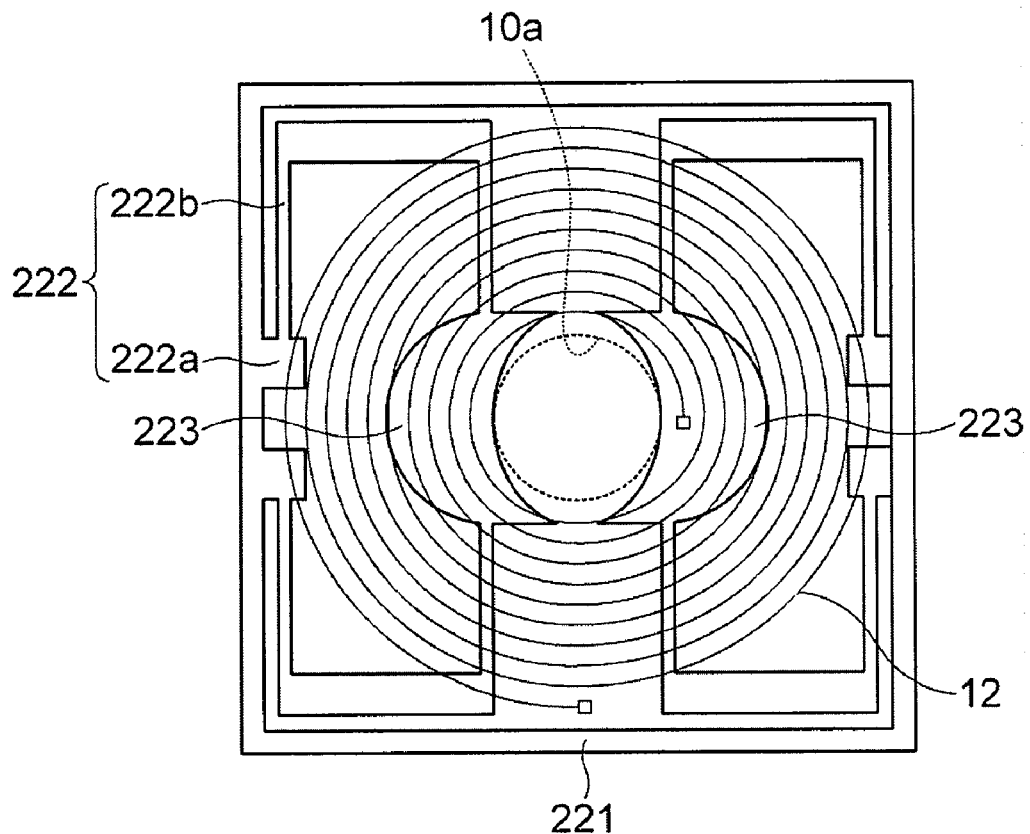
[FIG. 6]
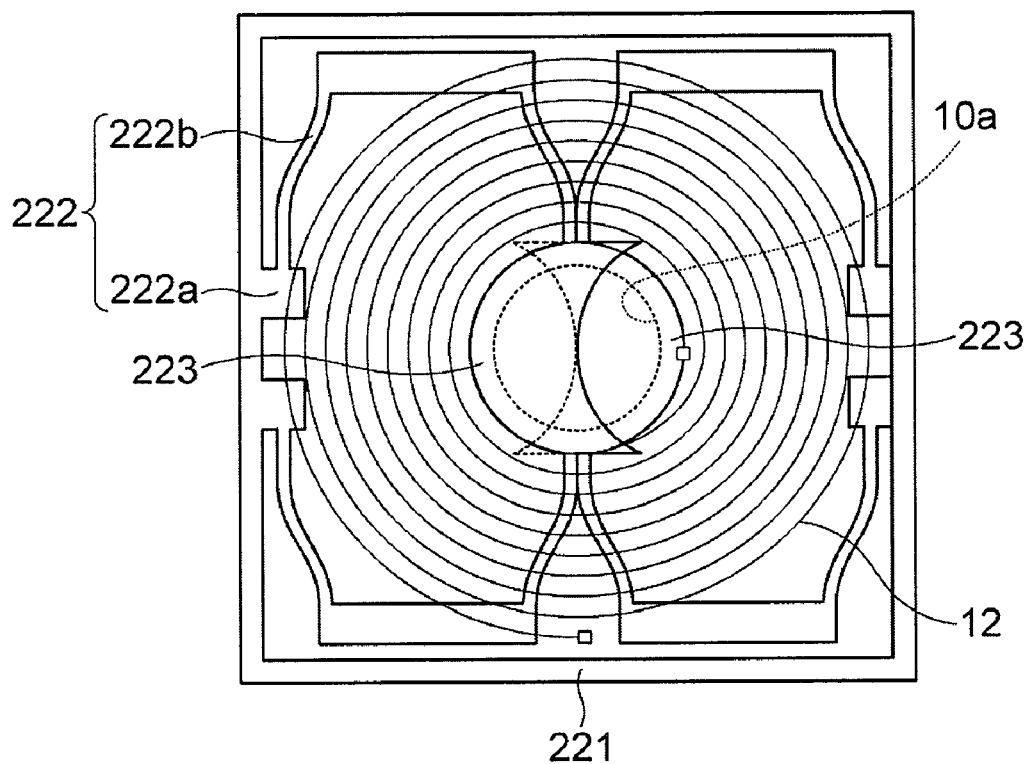

[FIG. 7]
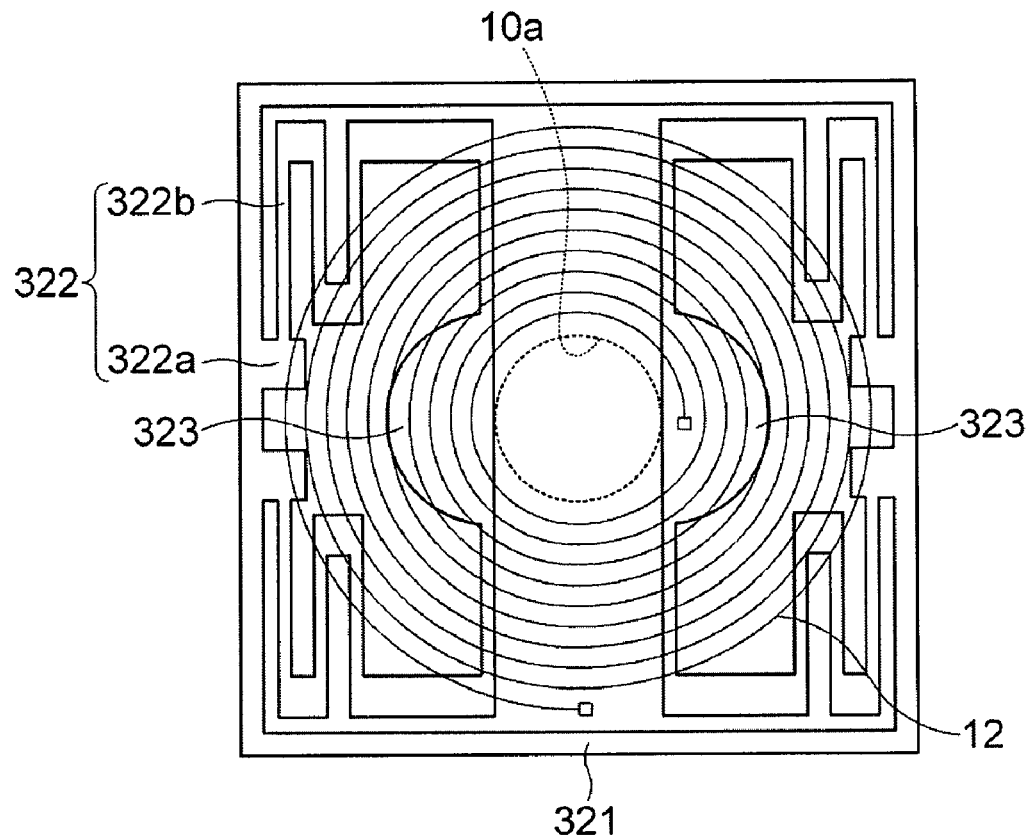
[FIG. 8]
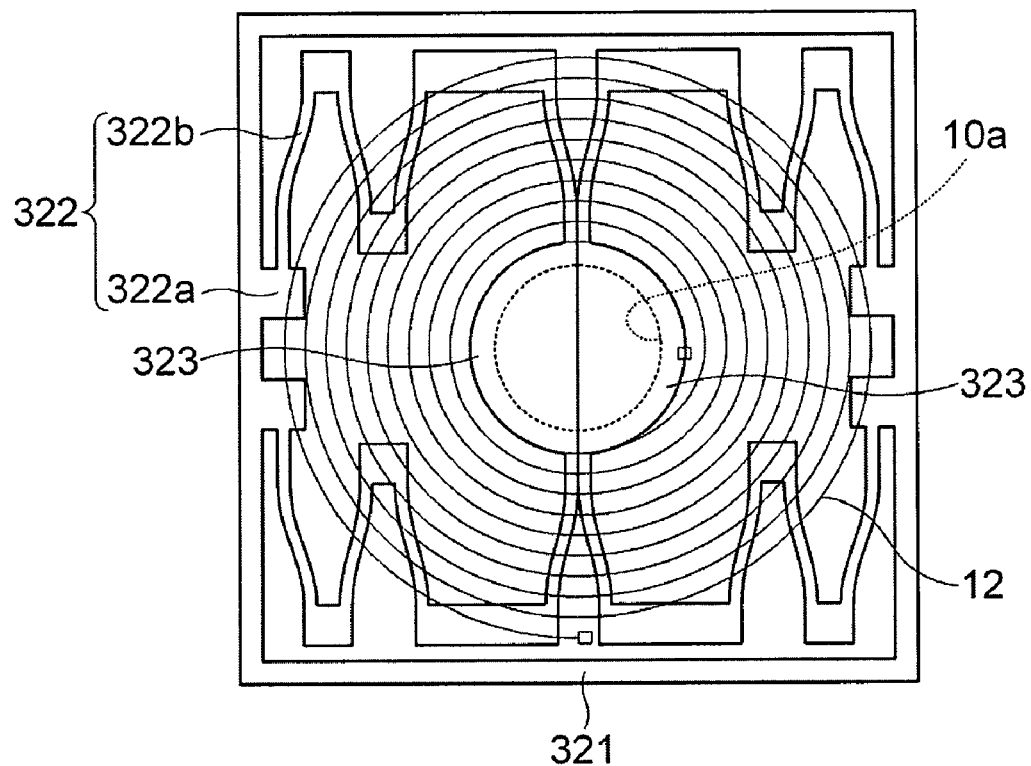

[FIG. 9]
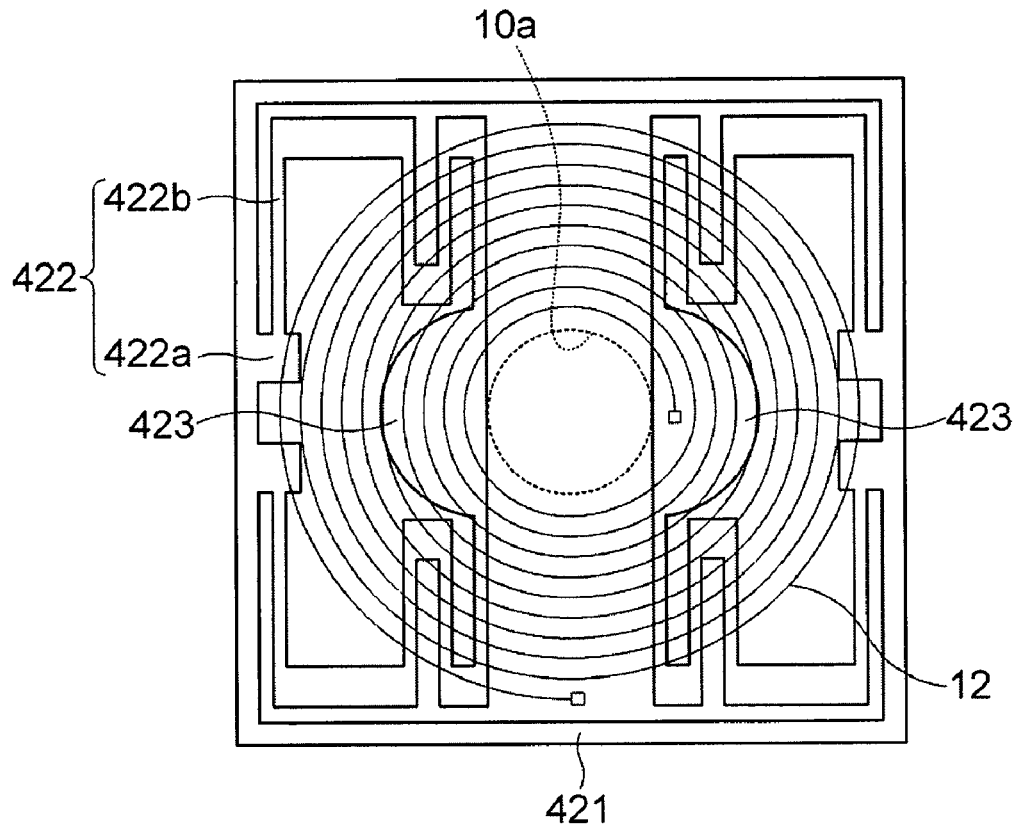
[FIG. 10]
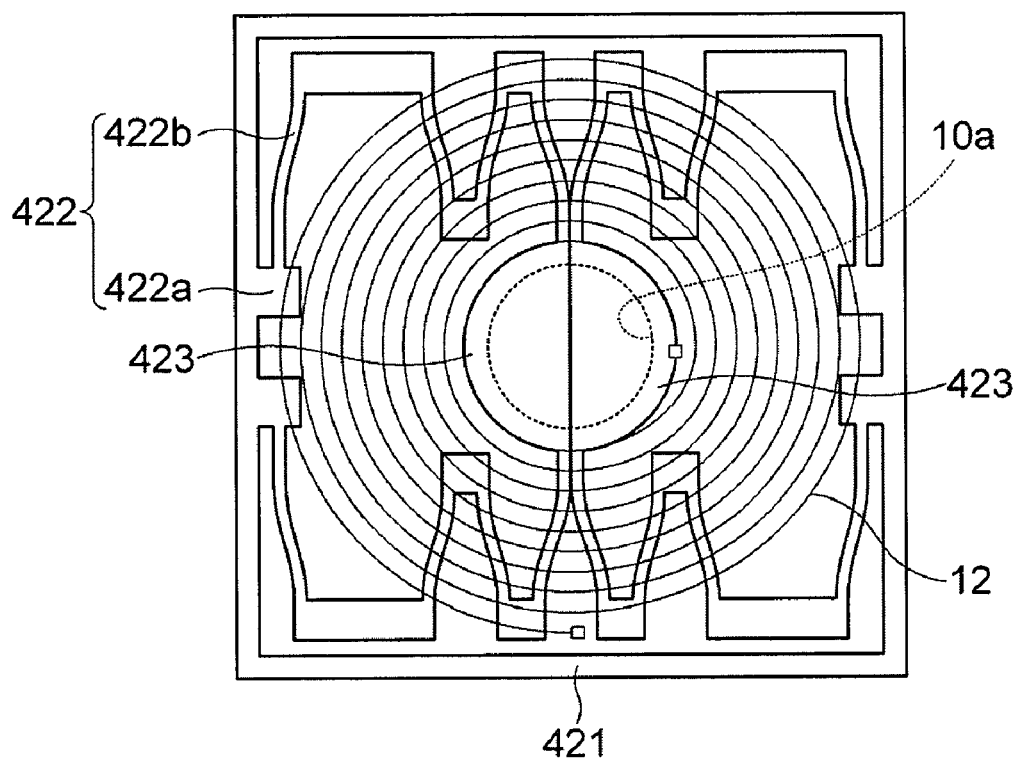

[FIG. 11]
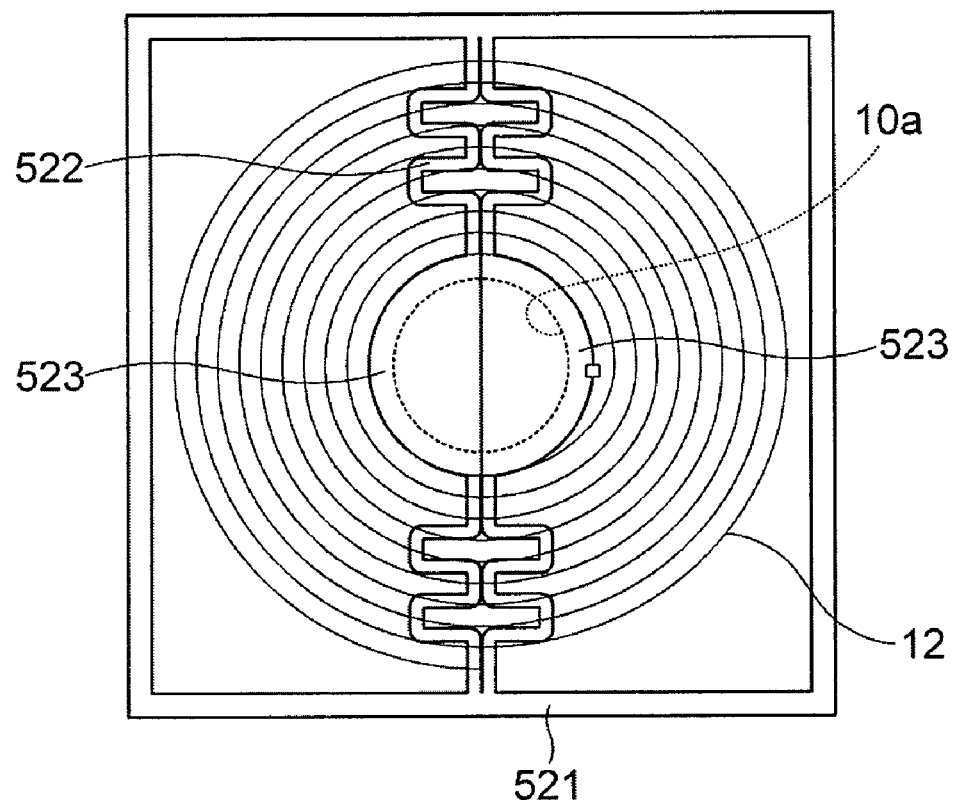
[FIG. 12]
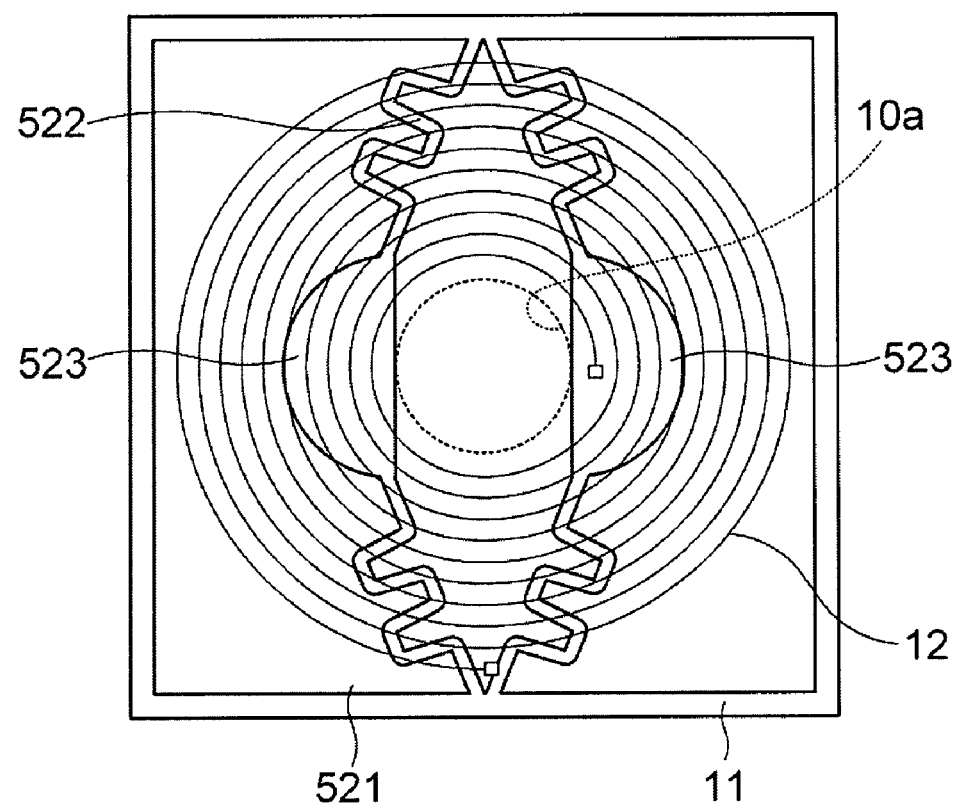

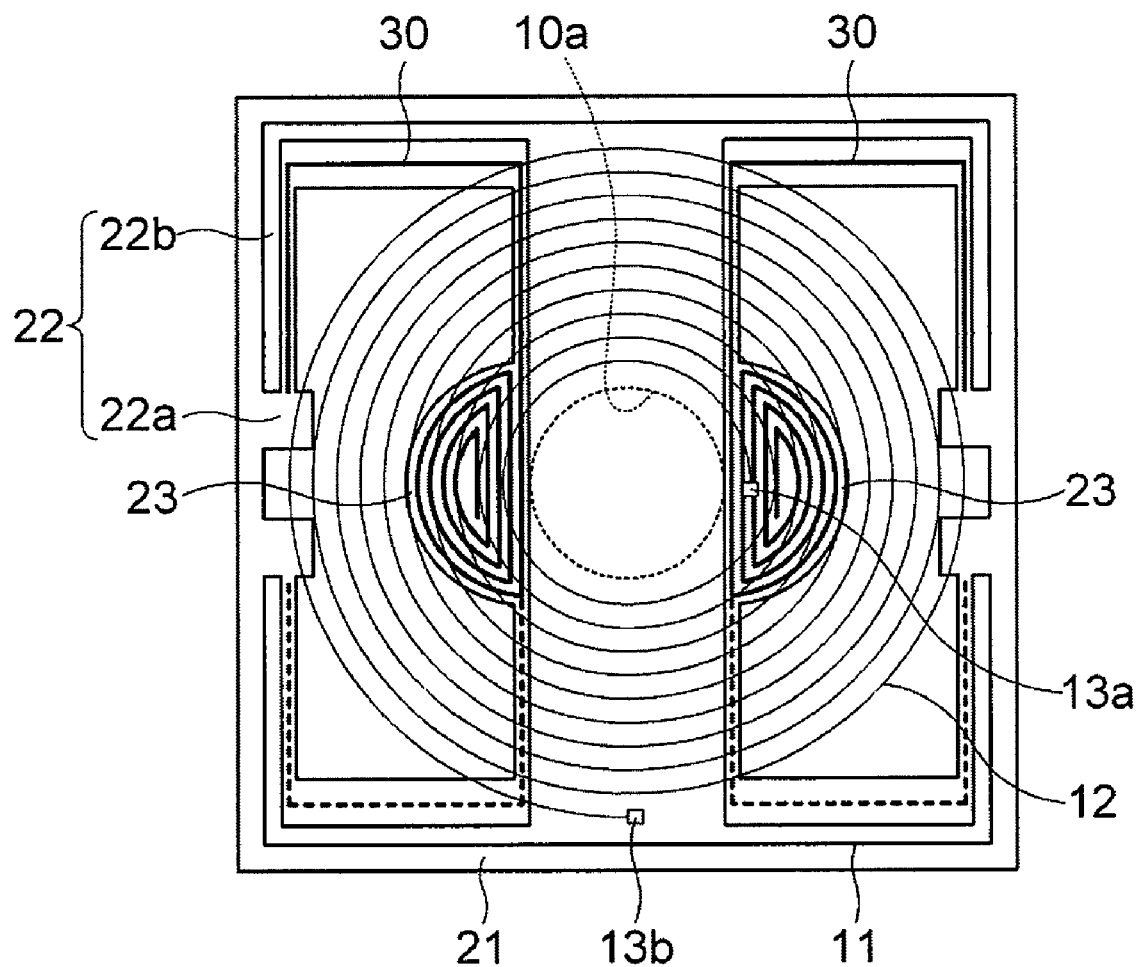
[FIG. 13]

SHUTTER DEVICE

CROSS-REFERENCE TO RELATED APPLICATIONS

This application claims the benefit of Korean Patent Application No. 10-2008-0037345 filed with the Korea Intellectual Property Office on Apr. 22, 2008, the disclosure of which is incorporated herein by reference.

BACKGROUND OF THE INVENTION

1. Field of the Invention

The present invention relates to a shutter device which can move shutter blades through an electromagnetic force and an elastic force so as to open or close a through-hole.

2. Description of the Related Art

With the development of the communication technology and the digital information processing technique, mobile terminals with various functions such as information processing, computing, communication, image information I/O and so on are being launched on the market.

PDAs (personal digital assistant) or mobile phones having a digital camera function and a communication function and mobile phones having a digital camera function and a PDA function can be taken as examples. With the development of the digital camera technology and information storage capacity, more and more mobile phones have a high-end digital camera module mounted thereon.

Further, as a mega-pixel image sensor is used in digital camera modules mounted on the mobile phones, the importance of a mechanical shutter device as well as an optical zoom function and an autofocusing function is emphasized.

Shutters of camera modules used in mobile phones are classified into electronic shutters and mechanical shutters.

When only the electronic shutter which is adjusted by software is used, a high-resolution photograph with a high quality cannot be expected. Therefore, more and more camera modules adopt the mechanical shutter which actually moves shutter blades to cut off unnecessary light during photographing, thereby increasing an image quality. Further, studies on a technique for reducing the size of the mechanical shutter are being actively conducted.

In the mechanical shutter, however, an electromagnet occupying a large volume is provided in the camera module, or a large number of components for implementing a complex mechanism are required. Therefore, there is a technical limit in reducing the size of the camera module.

SUMMARY OF THE INVENTION

An advantage of the present invention is that it provides a shutter device which can move shutter blades through an electromagnetic force and an elastic force so as to open or close a through-hole.

Additional aspects and advantages of the present general inventive concept will be set forth in part in the description which follows and, in part, will be obvious from the description, or may be learned by practice of the general inventive concept.

According to an aspect of the invention, a shutter device comprises a coil layer that includes one or more substrates having a through-hole formed in the center thereof and a coil installed thereon, the coil generating a magnetic field when a current is applied; and a shutter layer that is installed on one surface of the coil layer and includes a shutter case having a shape corresponding to the substrate and a pair of shutter blades which are connected to flexible suspensions formed in the shutter case, respectively. The shutter blades open and close the through-hole of the substrate, while being moved in the reverse direction to each other by an electromagnetic force caused by an interaction with the magnetic field generated by the coil and returning to the original position due to the recovery force of the flexible suspensions when the electromagnetic force is canceled.

The coil layer may be formed of a permanent magnet. Further, the coil layer may be installed on or under or on and under the shutter layer.

The coil layer may be formed by stacking the plurality of substrates.

When the plurality of substrates are stacked, the coils formed in the respective substrates may be electrically connected through conductive vias. In this case, conductive vias include via holes, which are formed in the respective substrates so as to correspond to each other, and conductive metal which is filled in the via holes such that the coils formed in the substrates are electrically connected to each other.

The via holes may be formed by a mechanical process, a chemical process, an optical process, or an anodizing process.

When the plurality of substrates are stacked, a non-conductor substrate may be installed between the substrates.

When the plurality of substrates are stacked, the coil formed in one substrate may overlap the coil formed in another substrate adjacent to the one substrate.

Alternatively, when the plurality of substrates are stacked, the coil formed in one substrate may not overlap the coil formed in another substrate adjacent to the one substrate.

When the plurality of substrates are stacked, the through-hole formed in one substrate may have the same size as that of the through-hole formed in another substrate adjacent to the one substrate.

Alternatively, when the plurality of substrates are stacked, the through-hole formed in one substrate may have a different size from that of the through-hole formed in another substrate adjacent to the one substrate.

The through-holes formed in the respective substrates may be constructed in such a manner that the size of the through-holes sequentially increases or decreases in a direction where the substrates are stacked.

Preferably, the surface substrate is flattened by a mechanical process or chemical process.

The coil may be completely or partially inserted into the substrate. Further, the coil may be wound around the circumference of the through-hole. In this case, the winding shape of the coil may be a circle, an ellipse, or a polygon.

Preferably, the coil is formed of conductive metal selected from the group consisting of Ag, Cu, Al, and Au. Further, the coil may be formed by an inkjet printing process, a screen printing process, a lithography process, or an electro plating process.

The substrate may be formed by an LTCC (Low Temperature Co-fired Ceramics) process. Further, the substrate may be formed in a circular, elliptical, or polygonal shape.

The substrate may be formed of silicon. Alternatively, the substrate may be formed of a ceramic material including glass. For example, the substrate may be formed of a ceramic material including any one of $SiO_2$, $B_2O_3$, CaO, MgO, and $Al_2O_3$.

Alternatively, the substrate may be formed of a magnetic substance with magnetic permeability. For example, the substrate may be formed of a magnetic substance including at least more than two elements of Fe, Co, Ni, Mn, Mg, Zn, and Cu.

Alternatively, the substrate may be formed of a material in which a magnetic substance with magnetic permeability and a ceramic material are mixed.

The through-hole may be formed by a mechanical process, a chemical process, or an optical process.

The shutter blades may be formed on the flexible suspensions corresponding to each other within the shutter case, respectively, so as to open and close the through-hole.

The pair of shutter blades may be formed so as to be moved on the same horizontal plane. Alternatively, the pair of shutter blades may be formed so as to be moved on different horizontal planes from each other.

Further, currents may be simultaneously applied to the pair of shutter blades to open or close the through-hole. Alternatively, a current may be sequentially applied to the pair of shutter blades to open or close the through-hole.

The shutter speed of the shutter blades may be adjusted depending on the intensity of the applied current.

The shutter blades may be formed in a semi-circular, circular, elliptical, polygonal, or new-moon shape.

The shutter blades may be moved in a direction where the through-hole is closed or opened, when the direction of the current is switched.

Each of the flexible suspensions may include a fixed portion formed on the shutter case; and a plurality of elastic portions which are formed so as to connect the fixed portion and the shutter blades within the shutter case and elastically support the shutter blades.

Each of the flexible suspensions may include a plurality of elastic portions of which one side is connected to the shutter case and the other side is connected to the shutter blade.

The flexible suspensions and the shutter blades composing the shutter layer may be integrally formed by a MEMS (Micro Electro Mechanical System) process.

The shutter layer may be formed by a combination of a conductor, a partially-insulated conductor, a non-conductor having a plated surface, and a magnetic substance, thereby forming a path through which a current flows into the shutter blades.

The length of the path of the current flowing in the shutter layer may be adjusted to vary the magnitude of the electromagnetic force which moves the shutter blades.

The shutter blades may have a path formed therein, through which a current flows, the path forming a predetermined pattern.

The partial insulation of the conductor may be formed by an anodizing process or chemical etching process.

As the displacement of the shutter blades is adjusted depending on the intensity of the applied current, the opening area of the through-hole may be controlled so as to adjust an amount of light transmitted through the through-hole.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is an exploded perspective view of a shutter device according to an embodiment of the invention;

FIG. 2 is a diagram schematically showing a state where the shutter device of FIG. 1 is opened;

FIG. 3 is a diagram schematically showing a state where the shutter device of FIG. 1 is closed;

FIG. 4 is an exploded perspective view of a shutter device according to another embodiment of the invention;

FIG. 5 is a diagram schematically showing a state where the shutter device of FIG. 4 is opened;

FIG. 6 is a diagram schematically showing a state where the shutter device of FIG. 4 is closed;

FIGS. 7 to 12 are diagrams schematically showing various examples of a flexible suspension of a shutter layer in the shutter device of FIG. 1; and FIG. 13 is a diagram schematically showing a path through which a current flows in the shutter layer of the shutter device according to the embodiment of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a shutter device according to the present invention will be described in detail with reference to the accompanying drawings.

FIG. 1 is an exploded perspective view of a shutter device according to an embodiment of the invention. FIG. 2 is a diagram schematically showing a state where the shutter device of FIG. 1 is opened. FIG. 3 is a diagram schematically showing a state where the shutter device of FIG. 1 is closed.

FIG. 4 is an exploded perspective view of a shutter device according to another embodiment of the invention. FIG. 5 is a diagram schematically showing a state where the shutter device of FIG. 4 is opened. FIG. 6 is a diagram schematically showing a state where the shutter device of FIG. 4 is closed.

FIGS. 7 to 12 are diagrams schematically showing various examples of a flexible suspension of a shutter layer in the shutter device of FIG. 1. FIG. 13 is a diagram schematically showing a path through which a current flows in the shutter layer of the shutter device according to the embodiment of the invention.

As shown in FIGS. 1 to 3, the shutter device according to the embodiment of the invention includes a coil layer 10 and a shutter layer 20.

The coil layer 10 includes one or more substrates 11 having a through-hole 10a formed in the center thereof and a coil 12 installed thereon, the coil 12 generating a magnetic field when a current is applied.

The shutter layer 20 includes a shutter case 21 which is installed on one surface of the coil layer 10 and has a shape corresponding to that of the substrate 11; and a pair of shutter blades 23 which are connected to flexible suspensions 22 formed in the shutter case 21, respectively. The shutter blades 23 are moved in the reverse direction to each other by an electromagnetic force generated by an interaction with the magnetic field generated by the coil 12, and return to the original position due to the recovery force of the flexible suspension 22 when the electromagnetic force is canceled. The shutter blades 23 open and close the through-hole 10a of the substrate 11 through the above-described operation.

The coil layer 10 may be formed of a layer composed of a permanent magnet.

The substrate 11 forming the coil layer 10 may be installed on or under or on and under the shutter layer 20.

When the coil layer 10 is composed of a single substrate 11, the coil 12 installed on the substrate 11 is wound around the circumference of the through-hole 10a of the substrate 11.

The coil 12 has pad-shaped terminals 13a and 13b formed at both ends thereof, respectively, through which a current is applied to the coil 12.

When the coil layer 10 is composed of a plurality of substrates 11, each of which includes the through-hole 10a formed therein and the coil 12 installed thereon, the electric connection between the coils 12 formed on the respective substrates 11 may be achieved through conductive vias (not shown).

That is, the coils 12 formed on the respective substrates 11 can be electrically connected through via holes which are formed in the substrates 11 so as to correspond to each other and conductive metal filled in the via holes.

As the plurality of substrates 11 are stacked so as to form the coil layer 10, a high magnetic field can be generated in a small space.

In this case, the via holes may be formed by a mechanical process, a chemical process, an optical process, or an anodizing process.

When the plurality of substrates 11 are stacked so as to form the coil layer 10, the coil layer 10 may be constructed in such a manner that the coils 12 formed in the respective substrates 11 are not electrically connected, but a current is individually applied to the coils 12 formed in the substrates 11.

In this case, it is preferable that currents are simultaneously applied to the coils 12 formed in the respective substrates 11.

Further, when the plurality of substrates 11 are stacked so as to form the coil layer 10, a non-conductor substrate may be installed between the substrates 11. In this case, the coils 12 formed in the respective substrates 11 may be electrically connected to each other through conductive vias composed of via holes and conductive metal.

Meanwhile, when the plurality of substrates 11 are stacked, the coil layer 10 may be constructed in such a manner that the coil 12 formed in one substrate 11 overlaps the coil 12 formed in another adjacent substrate 11 in a direction where the substrates 11 are stacked.

Alternatively, when the plurality of substrates 11 are stacked, the coil layer 10 may be constructed in such a manner that the coil 12 formed in one substrate 11 does not overlap the coil 12 formed in another adjacent substrate 11 in the direction where the substrates 11 are stacked.

Further, when the plurality of substrates 11 are stacked, the through-hole 10a formed in one substrate 11 may have the same size as that of the through-hole 10a formed in another adjacent substrate 11, although not shown specifically.

Alternatively, when the plurality of substrates 11 are stacked, the through-hole 10a formed in one substrate 11 may have a different size from that of the through-hole 10a formed in another adjacent substrate 11.

That is, the through-holes 10a formed in the respective substrates 11 may be constructed in such a manner that the size thereof sequentially increases or decreases along the direction where the substrates 11 are stacked.

Preferably, the surface of the substrate 11 is flattened through a mechanical process or chemical process. In this case, the plurality of substrates 11 can be stacked as slimly as possible, without stacking interference.

Meanwhile, the coil 12 installed on the substrate 11 may be completely or partially inserted into the substrate 11.

As described above, the coil 12 may be wound around the circumference of the through-hole 10a formed in the substrate 11.

In this case, the coil 12 may be wound in various shapes such as circle, ellipse, and polygon.

The coil 12 may be formed of conductive metal such as silver (Au), copper (Cu), or gold (Au) and may be formed by an inkjet printing process, a screen printing process, a lithography process, or an electro plating process.

The substrate 11 may be formed by an LTCC (Low Temperature Co-fired Ceramics) process.

That is, the substrate 11 may be formed by the following process: a green sheet having proper permittivity is formed, and conductive paste such as sliver or copper is printed as the coil 12 on the green sheet.

In this case, the green sheet forming the substrate 11 may be composed of a ceramic material in which glass with a low melting point is mixed.

For example, the green sheet forming the substrate 11 may be composed of a ceramic material including any one of $SiO_2$, $B_2O_3$, CaO, MgO, and $Al_2O_3$.

Further, the green sheet forming the substrate 11 may be composed of a magnetic substance having magnetic permeability.

For example, the green sheet forming the substrate 11 may be composed of a magnetic substrate including at least more than two elements of Fe, Co, Ni, Mn, Mg, Zn, and Cu.

Alternatively, the green sheet forming the substrate 11 may be composed of a material in which a magnetic substance with magnetic permeability and a ceramic material are mixed.

Further, the green sheet forming the substrate 11 may be composed of silicon.

The substrate 11 may be formed in various shapes such as circle, ellipse, and polygon.

The through hole 10a of the substrate 11 may be formed by a mechanical process, a chemical process, or an optical process.

Meanwhile, the shutter blades 23 may be formed in various shapes such as semi-circle, circle, ellipse, polygon, and new moon (refer to FIGS. 4 to 6). The shutter blades 23 are installed on the flexible suspensions 22 facing each other, respectively, in the shutter case 21 so as to open and close the through-hole 10a formed in the substrate 11.

The pair of shutter blades 23 may be installed so as to open or close the through-hole 10a while being moved in the reverse direction to each other.

That is, the pair of shutter blades 23 divided in a semi-circular shape 23 are moved from regions corresponding to both sides in the internal space of the shutter case 21 so as to close the through-hole 10a formed in the substrate 11, and return to the regions due to the recovery force of the flexible suspensions 22 so as to open the through-hole 10. Each of the flexible suspensions 23, which elastically support the respective shutter blades 23 in the shutter case 21 so as to provide a recovery force, includes a fixed portion 22a fixed to the shutter case 21 and a plurality of elastic portions 22b which connect the fixed portion 22a and the shutter blade 23.

Although not shown, the elastic portions 22b which connect the fixed portion 22a and the shutter blade 23 may be formed in an I or L shape.

Further, as shown in FIGS. 1 to 6, the elastic portions 22b and 222b may be formed in a U shape.

Further, as shown in FIGS. 7 to 10, the elastic portions 322b and 422b may be formed in a W shape.

Preferably, the elastic portions are formed in a W shape, in order to manufacture a shutter layer with a desirable specification by adjusting the displacement range and spring constant (recovery force) of the elastic portions.

The shutter case 21, the flexible suspensions 22, and the shutter blades 23 forming the shutter layer 20 may be formed by a combination of a conductor, a partially-insulated conductor, a non-conductor having a plated surface, and a magnetic substance, thereby forming a path through which a current can flow into the shutter blades 23.

The partial insulation may be formed by an anodizing process or a chemical etching process.

When the pair of shutter blades 23 are formed, currents are simultaneously applied to the shutter blades 23 so as to open or close the through-hole 10*a* formed in the substrate 11. Alternatively, a current is sequentially applied to the shutter blades 23 so as to open or close the through-hole 10*a* formed in the substrate 11.

Further, as shutter speed where the shutter blades 23 are opened and closed is controlled by adjusting the magnitude of current applied to the shutter blades 23, the opening or closing speed of the through-hole 10*a* formed in the substrate 11 can be adjusted.

As shown in FIGS. 11 and 12, each of the flexible suspensions may include a plurality of elastic portions of which one side is connected to the shutter case 521 and the other end is connected to the shutter blade.

In the shutter layer shown in FIGS. 11 and 12, before a current is applied to the coil 12 and the pair of shutter blades 523, the through-hole 10*a* of the substrate 11 is closed by the shutter blades 523 in a state where the shutter blades 523 are elastically supported by the elastic force of the elastic portions 522. When a current is applied to the coil 12 and the shutter blades 523, the shutter blades 523 are moved in a direction away from each other by the electromagnetic force, and simultaneously, the elastic portions 522 are elastically deformed so as to open the through-hole 10*a* of the substrate 11.

When the pair of shutter blades 23 are installed, the shutter blades 23 and the flexible suspensions 22, which elastically support the shutter blades 23 in the shutter case 21, are installed on the same horizontal plane such that the shutter blades 23 open or close the through-hole 10*a* while being moved on the same horizontal plane in the reverse direction to each other.

Alternatively, as shown in FIG. 4, the shutter blades 223 and the flexible suspensions 22, which elastically support the shutter blades 23 in the shutter case 21, are installed on different horizontal planes from each other such that the shutter blades 23 open or close the through-hole 10*a* while being moved on the different horizontal planes in the reverse direction to each other.

That is, the pair of shutter blades 223 may close the through-hole 10*a* formed in the substrate 11, while partially overlapping each other.

As shown in FIGS. 4 to 6, when the shutter blades 223 open or close the through-hole 10*a* formed in the substrate 11 while being moved on different horizontal planes in the reverse direction to each other, the shutter blades 223 are preferably formed in a new-moon shape.

That is, as the shutter blades 223 are formed in a new-moon shape, light is shielded or transmitted in a similar shape to the through-hole 10*a* by the shutter blades 223, when the shutter blades 223 are moved to or from both sides of the through-hole 10*a* so as to open or close the through-hole 10*a*. Then, the light transmitted through the through-hole 10*a* can be constantly incident or shielded in a radial shape with respect to the center of an image sensor.

Although not shown, when the shutter blades 223 open or close the through-hole 10*a* formed in the substrate 11 while being moved on different horizontal planes in the reverse direction to each other, the shutter blades 223 may be separately formed in different shutter cases.

That is, two shutter layers of which each includes one shutter case and one shutter blade may be simultaneously manufactured by a semiconductor process such as MEMS (Micro-Electro Mechanical System) process.

Not to mention, the shutter layer including one shutter case and two shutter blades may be integrally manufactured by the MEMS process.

Meanwhile, as shown in FIG. 13, when the path through which a current flows is formed in the shutter layer 20, that is, when the path 30 through which a current flows into the shutter blades 23 is formed, the length of the path 30 is adjusted so as to vary the magnitude of the electromagnetic force which moves the shutter blades 23.

That is, the length of the path 30 is enlarged by forming a predetermined pattern in the path 30 formed in the shutter blades 23 such that the distribution of magnetic fields generated by currents applied to the shutter blades 23 is varied. Then, the performance of the shutter, such as the shutter speed of the shutter blades 23 and power consumption, can be adjusted.

The partial insulation of the conductor can be formed by an anodizing process or chemical etching process.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A shutter device comprising:
   a coil layer that includes one or more substrates having a through-hole formed in the center thereof and a coil installed thereon, the coil generating a magnetic field when a current is applied; and
   a shutter layer that is installed on one surface of the coil layer and includes a shutter case having a shape corresponding to the substrate and a pair of shutter blades which are connected to flexible suspensions formed in the shutter case, respectively,
   wherein the shutter blades open and close the through-hole of the substrate, while being moved in the reverse direction to each other by an electromagnetic force caused by an interaction with the magnetic field generated by the coil and returning to the original position due to the recovery force of the flexible suspensions when the electromagnetic force is canceled.

2. The shutter device according to claim 1, wherein the coil layer is installed on or under or on and under the shutter layer.

3. The shutter device according to claim 1, wherein the coil layer is formed by stacking the plurality of substrates.

4. The shutter device according to claim 3, wherein when the plurality of substrates are stacked, the coils formed in the respective substrates are electrically connected through conductive vias.

5. The shutter device according to claim 4, wherein the conductive vias include via holes, which are formed in the respective substrates so as to correspond to each other, and conductive metal which is filled in the via holes such that the coils formed in the substrates are electrically connected to each other.

6. The shutter device according to claim 5, wherein the via holes are formed by a mechanical process, a chemical process, an optical process, or an anodizing process.

7. The shutter device according to claim 3, wherein when the plurality of substrates are stacked, a non-conductor substrate is installed between the substrates.

8. The shutter device according to claim 3, wherein when the plurality of substrates are stacked, the coil formed in one substrate overlaps the coil formed in another substrate adjacent to the one substrate.

9. The shutter device according to claim 3, wherein when the plurality of substrates are stacked, the coil formed in one substrate does not overlap the coil formed in another substrate adjacent to the one substrate.

10. The shutter device according to claim 3, wherein when the plurality of substrates are stacked, the through-hole formed in one substrate has the same size as that of the through-hole formed in another substrate adjacent to the one substrate.

11. The shutter device according to claim 3, wherein when the plurality of substrates are stacked, the through-hole formed in one substrate has a different size from that of the through-hole formed in another substrate adjacent to the one substrate.

12. The shutter device according to claim 11, wherein the through-holes formed in the respective substrates are constructed in such a manner that the size of the through-holes sequentially increases or decreases in a direction where the substrates are stacked.

13. The shutter device according to claim 1, wherein the substrate is formed of silicon.

14. The shutter device according to claim 1, wherein the coil is completely or partially inserted into the substrate.

15. The shutter device according to claim 1, wherein the coil is wound around the circumference of the through-hole.

16. The shutter device according to claim 15, wherein the winding shape of the coil is a circle, an ellipse, or a polygon.

17. The shutter device according to claim 1, wherein the coil is formed of conductive metal selected from the group consisting of Ag, Cu, Al, and Au.

18. The shutter device according to claim 1, wherein the coil is formed by an inkjet printing process, a screen printing process, a lithography process, or an electro plating process.

19. The shutter device according to claim 1, wherein the substrate is formed by an LTCC (Low Temperature Co-fired Ceramics) process.

20. The shutter device according to claim 1, wherein the substrate is formed in a circular, elliptical, or polygonal shape.

21. The shutter device according to claim 1, wherein the substrate is formed of a ceramic material including glass.

22. The shutter device according to claim 21, wherein the substrate is formed of a ceramic material including any one of $SiO_2$, $B_2O_3$, CaO, MgO, and $Al_2O_3$.

23. The shutter device according to claim 1, wherein the substrate is formed of a magnetic substance with magnetic permeability.

24. The shutter device according to claim 23, wherein the substrate is formed of a magnetic substance including at least more than two elements of Fe, Co, Ni, Mn, Mg, Zn, and Cu.

25. The shutter device according to claim 1, wherein the substrate is formed of a material in which a magnetic substance with magnetic permeability and a ceramic material are mixed.

26. The shutter device according to claim 1, wherein the through-hole is formed by a mechanical process, a chemical process, or an optical process.

27. The shutter device according to claim 1, wherein the shutter blades are formed on the flexible suspensions corresponding to each other within the shutter case, respectively, so as to open and close the through-hole.

28. The shutter device according to claim 27, wherein the pair of shutter blades are formed so as to be moved on the same horizontal plane.

29. The shutter device according to claim 27, wherein the pair of shutter blades are formed so as to be moved on different horizontal planes from each other.

30. The shutter device according to claim 27, wherein currents are simultaneously applied to the pair of shutter blades to open or close the through-hole.

31. The shutter device according to claim 27, wherein a current is sequentially applied to the pair of shutter blades to open or close the through-hole.

32. The shutter device according to claim 1, wherein the shutter speed of the shutter blades is adjusted depending on the intensity of the applied current.

33. The shutter device according to claim 1, wherein the shutter blades are formed in a semi-circular, circular, elliptical, polygonal, or new-moon shape.

34. The shutter device according to claim 1, wherein the shutter blades are moved in a direction where the through-hole is closed or opened, when the direction of the current is switched.

35. The shutter device according to claim 1, wherein each of the flexible suspensions includes:
a fixed portion formed on the shutter case; and
a plurality of elastic portions which are formed so as to connect the fixed portion and the shutter blades within the shutter case and elastically support the shutter blades.

36. The shutter device according to claim 1, wherein each of the flexible suspensions includes a plurality of elastic portions of which one side is connected to the shutter case and the other side is connected to the shutter blade.

37. The shutter device according to claim 1, wherein the flexible suspensions and the shutter blades composing the shutter layer are integrally formed by a MEMS (Micro Electro Mechanical System) process.

38. The shutter device according to claim 1, wherein the shutter layer is formed by a combination of a conductor, a partially-insulated conductor, a non-conductor having a plated surface, and a magnetic substance, thereby forming a path through which a current flows into the shutter blades.

39. The shutter device according to claim 38, wherein the length of the path of the current flowing in the shutter layer is adjusted to vary the magnitude of the electromagnetic force which moves the shutter blades.

40. The shutter device according to claim 39, wherein the shutter blades have a path formed therein, through which a current flows, the path forming a predetermined pattern.

41. The shutter device according to claim 38, wherein the partial insulation of the conductor is formed by an anodizing process or chemical etching process.

42. The shutter device according to claim 1, wherein as the displacement of the shutter blades is adjusted depending on the intensity of the applied current, the opening area of the through-hole is controlled so as to adjust an amount of light transmitted through the through-hole.

43. The shutter device according to claim 1, wherein the coil layer is formed of a permanent magnet.

* * * * *